United States Patent [19]

Scott et al.

[11] Patent Number: 5,311,596
[45] Date of Patent: May 10, 1994

[54] CONTINUOUS AUTHENTICATION USING AN IN-BAND OR OUT-OF-BAND SIDE CHANNEL

[75] Inventors: Robert E. Scott, Clearwater; Richard K. Smith, Seminole, both of Fla.

[73] Assignee: AT&T Bell Laboratories, Murray Hill, N.J.

[21] Appl. No.: 937,009

[22] Filed: Aug. 31, 1992

[51] Int. Cl.$^5$ .............................................. H04K 1/10
[52] U.S. Cl. ........................................ 380/33; 380/23
[58] Field of Search ....................... 380/23, 24, 25, 33, 380/34; 379/7, 62, 63, 45, 351

[56] References Cited

U.S. PATENT DOCUMENTS

| | | | |
|---|---|---|---|
| 4,645,871 | 2/1987 | Bremer et al. | 380/23 |
| 4,831,648 | 5/1989 | Nishino | 379/95 |
| 4,965,827 | 10/1990 | McDonald | 380/25 X |
| 5,099,515 | 3/1992 | Kobayashi et al. | 379/7 X |
| 5,146,472 | 9/1992 | Hallman | 380/23 X |
| 5,148,479 | 9/1992 | Bird et al. | 380/23 |

Primary Examiner—Tod R. Swann
Attorney, Agent, or Firm—Joseph J. Opalach

[57] ABSTRACT

A re-authentication procedure between the modems of a public switched telephone network (PSTN) data connection, which is between a computer facility and a user, provides a secure method for protecting the computer facility against an active wire tap, or spoofing, by an intruder. In particular, the user's modem and the computer's modem perform a re-authentication procedure throughout the duration of the data connection. This re-authentication procedure is transparently performed on a side channel of the data connection. This side channel can either be an in-band channel or an out-of-band channel. The re-authentication procedure comprises an exchange of encrypted information between the two modems. If one of the modems detects the presence of an active wire tap, that modem simply interrupts the data connection.

30 Claims, 5 Drawing Sheets

CONTINUOUS AUTHENTICATION USING AN IN-BAND OR OUT-OF-BAND SIDE CHANNEL

BACKGROUND OF THE INVENTION

The present invention relates to modems and to computer systems. In particular, this invention relates to the use of modems to provide secure access to a computer system.

The use of computers in today's world is continually on the increase, from main-frames to personal computers, more and more people are using computer systems. In fact, it is the accessibility of a computer itself, via a modem and the public switched telephone network (PSTN), that allows almost anyone to benefit from the use of a computer. Unfortunately, this accessibility also seems to attract "intruders," i.e., illegitimate users of a computer system. As a result, the security of a computer system, or even a network of computers, as to both the integrity and distribution of the information stored on a computer, is an item of continuing concern to the legitimate users, owners, and operators of computers.

In response to this need of providing some type of access security to a computer system, various methods are used for authenticating the identity of a user requesting access. One example is the well-known use of a "password." A variation of this, in the case of modem access, is a "password/callback" technique in which the called computer calls back the user at a predetermined telephone number after the password has been successfully entered by the user. Another example, is a challenge/response scheme where the computer, or "grantor," sends a random number—the challenge—to the user, or "requestor," and the requestor proves his identity by encrypting the random number using a secret key shared by the grantor and the requestor. In fact there are industry standards, like ANSI X9.26-1990, "Sign-on Authentication for Wholesale Financial Systems," which provide a strong node-to-node authentication procedure using a "challenge/response" protocol and the Data Encryption Standard (DES) algorithm.

However, password and password/callback techniques offer little protection against someone subsequently taking control of the data connection and thereby "spoofing" the computer system. In addition, the challenge/response method of ANSI X9.26-1990 only provides a method for authenticating a user's identity during the initial sign-on, or login, procedure. In other words, the above-mentioned techniques do not protect against an intruder who uses an "active wire tap" that disconnects the user after the initial sign-on procedure and allows the intruder to take control of the data connection to access the computer.

As a result, if access security to a computer system is of prime concern, as opposed to privacy of the data connection itself, other techniques are required to ensure that a data connection is not vulnerable to an active wire tap. For example, complete encryption of the data stream using DES encryption is one possible means of preventing an intruder from subsequently gaining access. Another alternative is illustrated by U.S. Pat. No. 4,802,217, issued to Michener on Jan. 31, 1989, in which a computer controls a security device that is connected between a user's terminal and the user's modem. In particular, the user dials the computer system, which receives an encrypted first codeword from the security device. The computer then instructs the security device to change the first encrypted codeword to a second encrypted codeword, disconnects the line, and calls back the user. Upon completion of the callback by the computer, the security device then sends the second encrypted codeword to the computer to establish the data connection. Thereafter, the computer periodically instructs the security device to change to another encrypted codeword, upon which the security device sends the new encrypted codeword to the computer, which then checks the received encrypted codeword and thereby verifies the continuing integrity of the data connection to the original user.

Consequently, unless there is a constant re-affirmation of identity, either by full data encryption or, as suggested by the Michener patent, by periodic re-authentication, an intruder can bridge the line and take over the data connection thereby gaining unauthorized access to resources and information or injecting information to his advantage. However, this prior art, while providing a level of protection against an active wire tap, is not the complete answers to the problem. For example, full data encryption affects both the cost and complexity of the communications system typically involving the computer and the user's terminal. Similarly, the Michener patent requires modification of the computer's software and a separate security device between the user's terminal and the user's modem.

SUMMARY OF THE INVENTION

The present invention provides the users, owners, and operators of computers with flexibility in providing access security against an active wire tap of a PSTN data connection to a computer. In particular, we have realized that the one component typically common in a PSTN data connection is the equipment that mediates between the terminal equipment and the transmission medium, i.e., the modem itself. Therefore, and in accordance with the principles of this invention, access security is provided to a PSTN data connection by a continuous re-authentication procedure between the modems. This continuous re-authentication procedure occurs in a non-interfering manner by using a side channel of the data connection to periodically or aperiodically send authentication information during the duration of the data connection. The side channel can be in-band, where the re-authentication information is time-division multiplexed in between any data transmissions, or the side channel can be out-of-band, where a narrow portion of the available bandwidth is used to exchange the re-authentication information using frequency division multiplexing (FDM) techniques. As a result, access security is transparently provided to the PSTN data connection and neither additional security devices, nor modification of the user's equipment, or the computer system, is required.

In one embodiment of the invention, both the answering modem and the originating modem support the DES algorithm and the answering modem re-authenticates the originating modem. In order to re-authenticate the originating modem, the answering modem occasionally initiates a chanllenge/response sequence throughout the duration of the data connection. In particular, the answering modem comprises a list of data encryption keys where each data encryption key corresponds to an identifier that is associated with a particular modem. Upon answering a telephone call, the answering modem requests the originating modem to identify itself, by sending its identifier, so that the answering modem can select the associated data encryption key. Thereafter, the answering modem occasionally generates a random number that is sent as a challenge to the originating modem, which, upon receiving the challenge, returns a response to the answering modem. This response is an encrypted form of the random number, where the originating modem's encryption process uses a data encryption key that is identical to the data encryption key used by the answering modem. The latter decrypts the response and compares it to the challenge. If the decrypted response and the challenge match, the originating modem's identity has been verified. On the other hand, if the decrypted response and the challenge do not match, indicating that a possible spoofing attempt has been detected, the answering modem merely drops the data connection.

DETAILED DESCRIPTION

Figure 1:
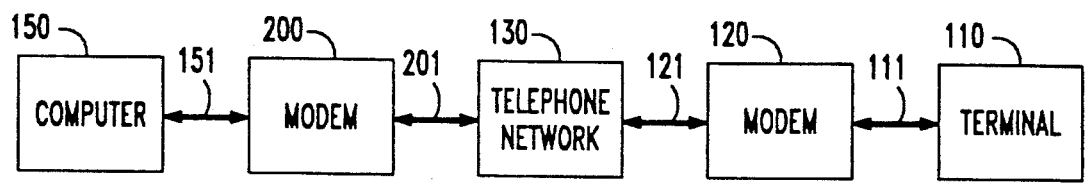
FIG. 1 is a block diagram of a point-to-point data communications system.
Figure 2:
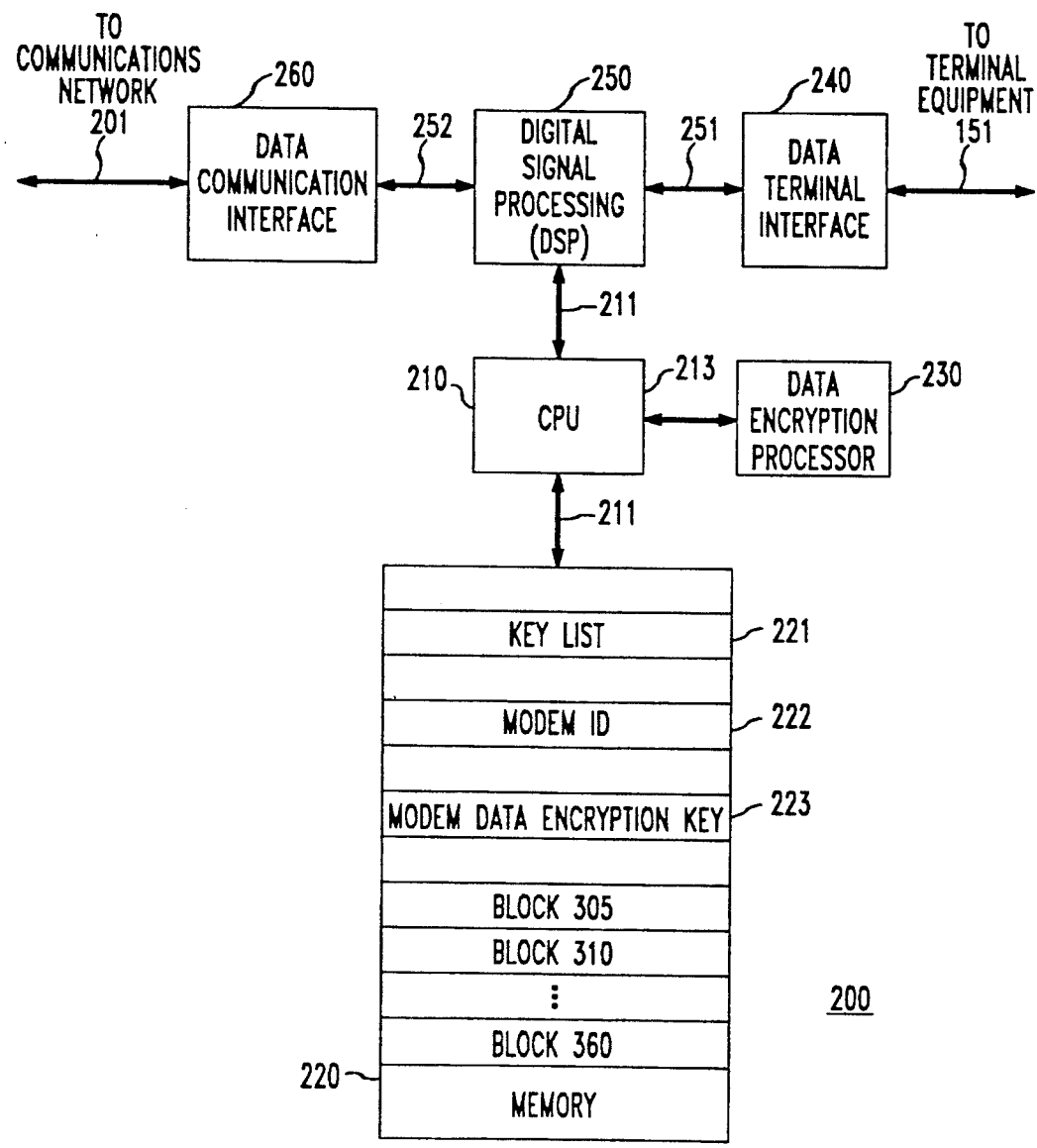
FIG. 2 is a block diagram of a modem embodying the principles of the invention that is used in the data communications system of FIG. 1.

A point-to-point data communications system is shown in FIG. 1. In the following example, it is assumed a calling party (the user) at terminal 110 originates a telephone call in order to access the called party (computer 150) through originating modem 120, telephone network 130, and answering modem 200. Lines 201 and 121 are representative of typical "tip/ring," or local loop, access provided by telephone network 130. Both modems 120 and 200 embody the principles of the invention, however, for simplicity only modem 200 is shown in detail in FIG. 2. Except for the inventive concept discussed below, modem 200 is representative, as is known in the art, of data communications equipment, which interfaces data terminal equipment, e.g., computer 150, to a data circuit—here the PSTN. The PSTN is represented by lines 201 and 121, and telephone network 130. In particular, in the context of this invention, the term data communications equipment means an apparatus that provides 1) the functions required to establish a data connection and 2) provides for the signal conversion and coding between the data terminal equipment and the data circuit. Modem 200 comprises memory 220, CPU 210, digital signal processor (DSP) 250, data encryption processor 230, data communications interface 260, and data terminal interface 240. CPU 210 is a microprocessor central processing unit, which operates on, or executes, program data stored in memory 220, via path 211. Memory 220 is representative of random access memory, and comprises a number of representative storage locations, of which a subset is shown in FIG. 2. It is assumed that memory 220 includes key list 221. Data encryption processor 230 supports the DES encryption standard and operates on data supplied by CPU 210 via lead 213. Illustratively, data encryption processor 230 functions in accordance with the "electronic code-book encryption" process specified by the DES Standard, e.g., "Federal Information Processing Standard 46." It should be noted that for clarity data encryption processor 230 is shown separate from CPU 210 and memory 220. However, as will become clear from the following description, an alternative, and less costly, implementation is one where the data encryption algorithm executed by data encryption processor 230 is simply directly performed by CPU 210, which would execute a data encryption program stored in memory 220. Finally, for simplicity, it is assumed that DSP 250 includes other well-known processing functions and circuitry, like filters, analog-to-digital converters and digital-to-analog converters for processing an incoming or outgoing signal.

As a result of the originating telephone call from modem 120, modem 200 receives an incoming signal, on lead 201, from telephone network 130. This incoming signal is applied by data communications interface 260 to DSP 250. The latter, under the control of CPU 210, performs a CCITT V.32 call establishment sequence that includes modem handshaking and training to establish the data connection with modem 120. After the establishment of the data connection, DSP 250 performs the signal conversion and coding for the resultant data streams between computer 150, via data terminal interface 240, and terminal 110, via data communications interface 260, etc.

Figure 3:
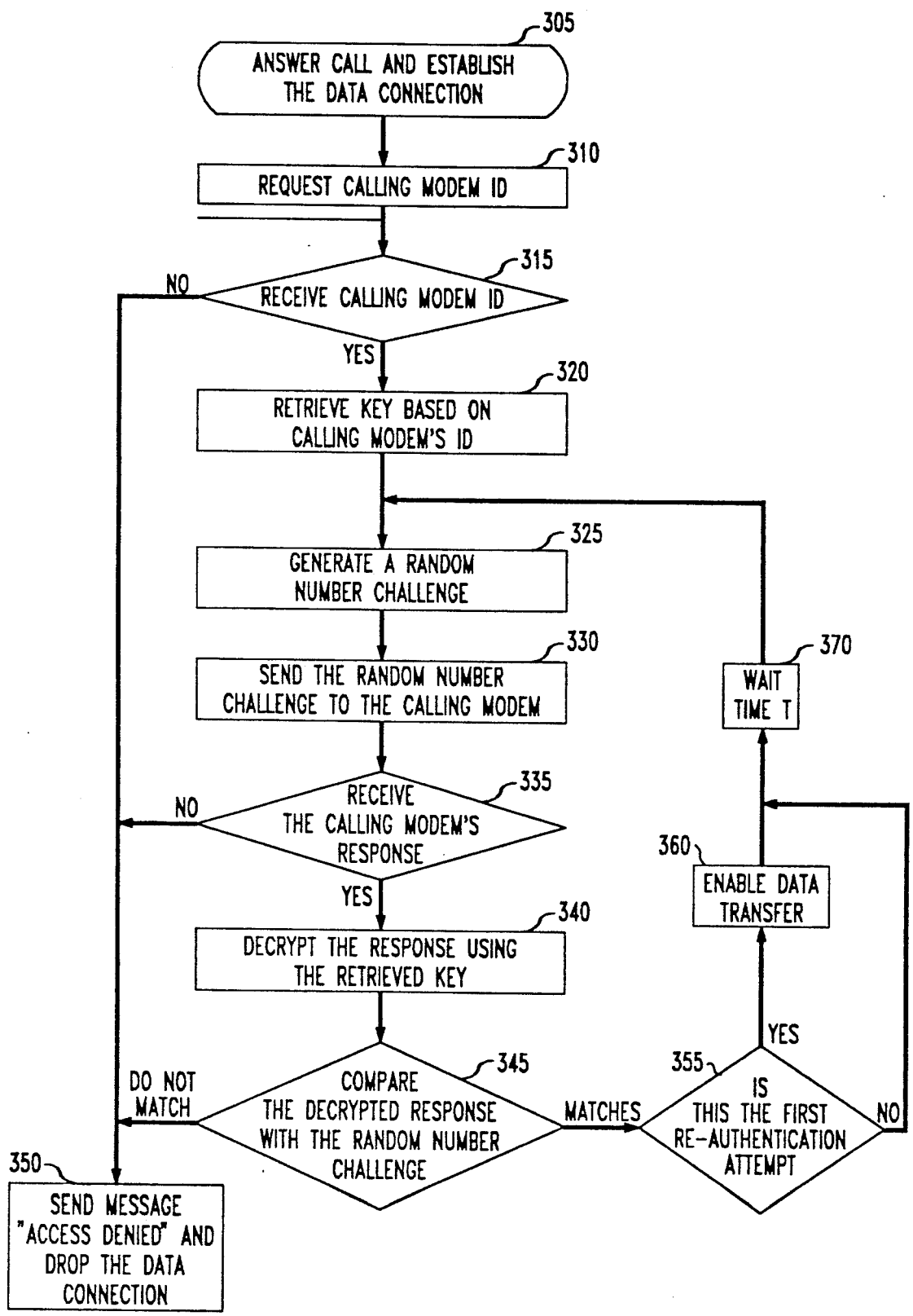
FIG. 3 is a flow diagram of a method used in the modem of FIG. 2.

In accordance with the principles of this invention, answering modem 200 provides a user transparent (cryptographic) one-way node-to-node re-authentication of originating modem 120 via a challenge/response protocol, which is illustrated in the flow diagram of FIG. 3. In particular, after establishing the data connection with originating modem 120 in step 305, CPU 210 proceeds to step 310 and sends a request to modem 120 for its modem identification (ID) number, via DSP 250. The modem ID number is a predetermined number assigned to the originating modem (discussed below). If CPU 210 does not receive the originating modem's ID number in step 315, CPU 210 simply sends a message "access denied" and drops the data connection in step 350. However, if CPU 210 receives the originating modem's ID number, CPU 210 proceeds to step 320 and retrieves from key list 221 a corresponding data encryption key. Key list 221 is stored in memory 220 a priori, and represents a plurality of modem ID numbers, each of which represents a possible originating modem, where each modem ID number is associated with a data encryption key. This associated data encryption key, like the modem ID, is also determined a priori in the originating modem.

After retrieving the associated data encryption key for modem 120, CPU 210 randomly generates a number, which is known as a challenge in step 325. This challenge is sent to modem 120 in step 330. Upon receiving the challenge from modem 200, modem 120 encrypts the challenge, via its data encryption processor (not shown), to generate a response, i.e., a form of "cipher text," which is sent back to modem 200. The encryption performed by modem 120 uses its stored data encryption key, mentioned above. Both the challenge and the response each comprise at least 20 bits of data so that there is a one in a million chance of discovery of the correct response. If CPU 210 does not receive a response from modem 120 in step 335, CPU 210 sends a message "access denied" and drops the data connection in step 350. However, if CPU 210 receives a response, CPU 210 proceeds to step 340 and decrypts the response using the associated data encryption key retrieved in step 320. The decryption of the received response is performed by CPU 210 via data encryption processor 230, which supports the DES encryption standard. CPU 210 then verifies the identify of modem 120. If the decrypted response and the challenge do not match in step 345, CPU 210 sends a message "access denied" and interrupts, e.g., drops the data connection in step 350. (It should be noted at this point that other alternatives for answering modem 200 exist, e.g., instead of dropping the data connection, initiating a "trace" of the data connection.) However, if CPU 210 verifies the identity of modem 120, i.e., the decrypted response and the challenge match, CPU 210 does not disturb the data connection and proceeds to step 355, where it checks if this is the completion of the first re-authentication attempt. If this is the completion of the first re-authentication attempt, CPU 210 enables the transfer of data information between modem 200 and modem 120 in block 360. Once the data transfer is enabled, subsequent re-authentication attempts bypass step 360 and proceed directly to step 370, where CPU 210 sets an interrupt for a predetermined period of time T. After the period of time, T, passes, CPU 210 re-authenticates the data connection by repeating steps 325 through 345. This re-authentication process continues for the duration of the data connection.

Figure 4:
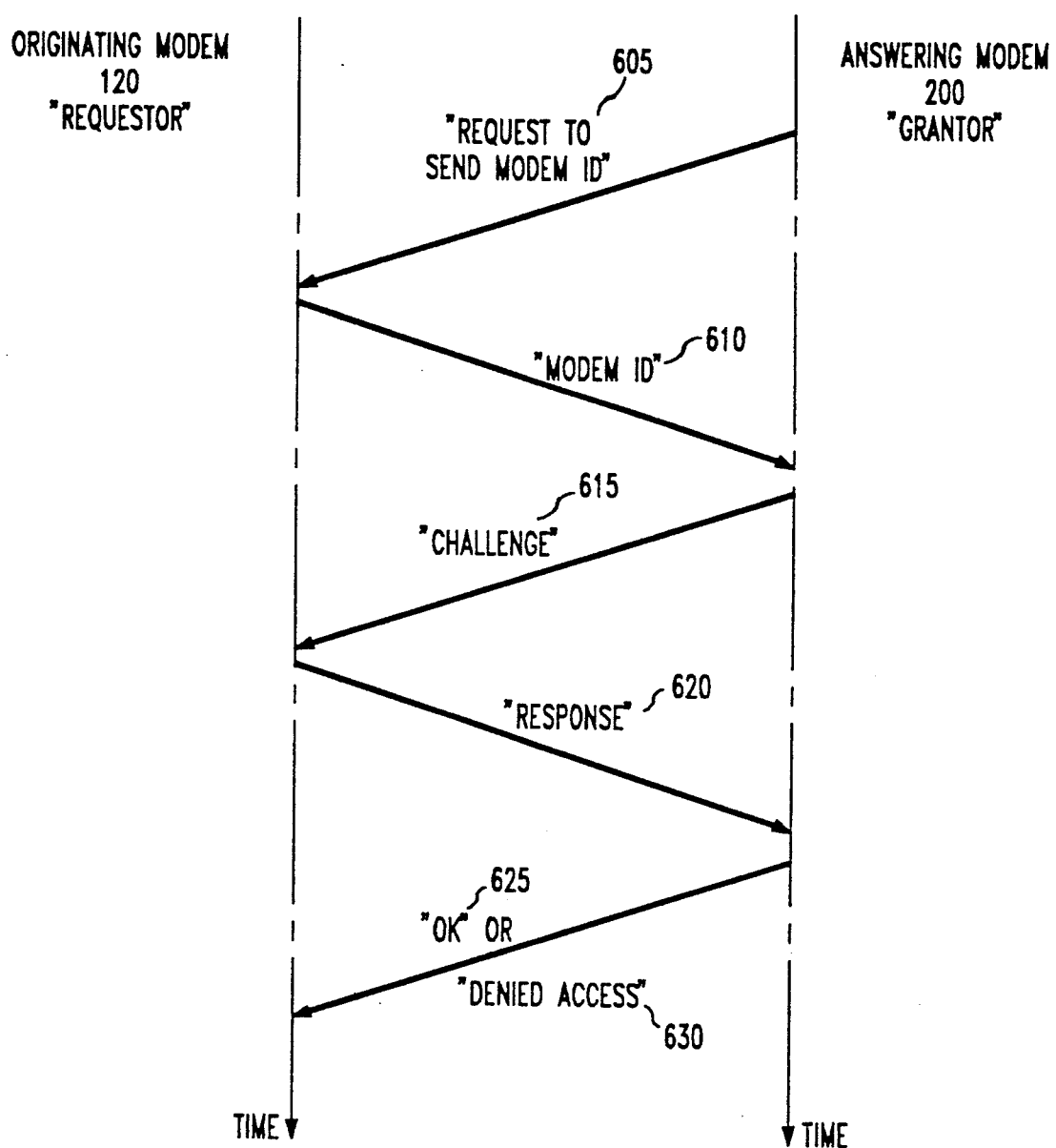
FIG. 4 is a flow diagram showing the re-authentication procedure embodying the principles of the invention.

The above-described authentication process is also shown in FIG. 4. Answering modem 200, the grantor, transmits a "send modem ID" message 605 to originating modem 120, the requestor, which responds by transmitting "ID" 610. After this, answering modem 200 transmits "challenge" 615 to originating modem 120, which transmits "response" 620. If the decryption of response 620, as described above, matches challenge 615, answering modem 200 may send "OK" message 625. However, if the decryption of response 620 does not match challenge 615, modem 200 sends an "access denied" message 630.

Figure 5:
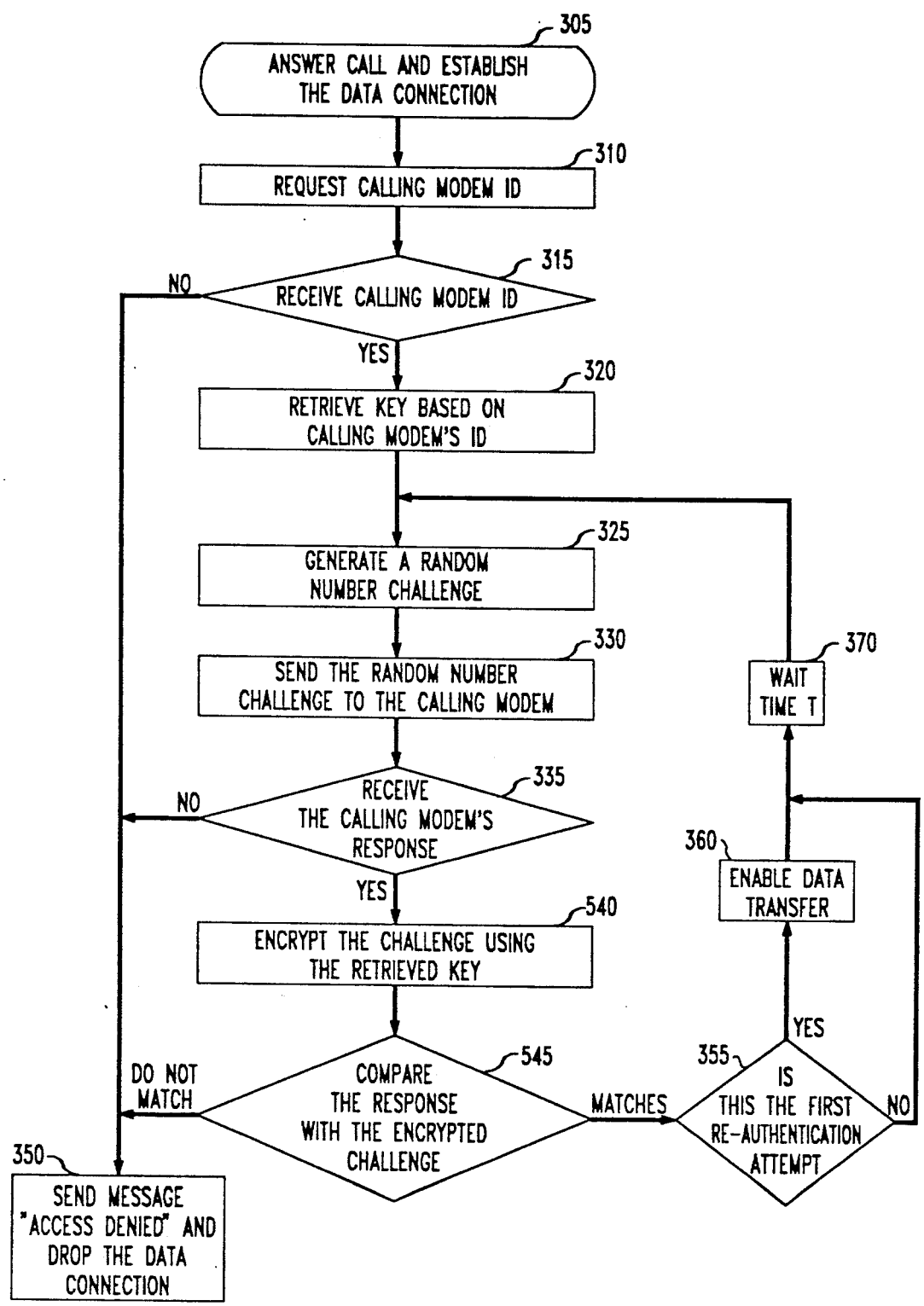
FIG. 5 is a flow diagram of another method used in the modem of FIG. 2.

An alternative method to the one described above and shown in FIG. 3 is shown in FIG. 5. The only difference is in steps 540 and 545. In step 540, modem 200 encrypts the challenge that was transmitted to modem 120 in step 330. The challenge is encrypted using the data encryption key associated with modem 120 and retrieved in step 320. A verification of the identity of modem 120 is performed by comparing the encrypted challenge and the response from modem 120 in step 545. As described above, if the challenge as encrypted by modem 120, i.e., its response, matches the challenge as encrypted by modem 200, then the data connection is not disturbed and CPU 210 proceeds to step 355. However, if a match does not occur, the data connection is interrupted in step 350.

The above-described re-authentication process of FIGS. 3 and 5 takes place on a side channel of the data connection. In other words, a portion of the bandwidth of the data connection is used to transport the re-authentication information. As a result, the data connection comprises a primary channel—for transporting the data—and a side channel—for transporting ancillary information. This side channel essentially multiplexes the re-authentication information with the transport of data. Specifically, for a side channel, either an in-band channel or an out-of-band channel is used.

Figure 6:
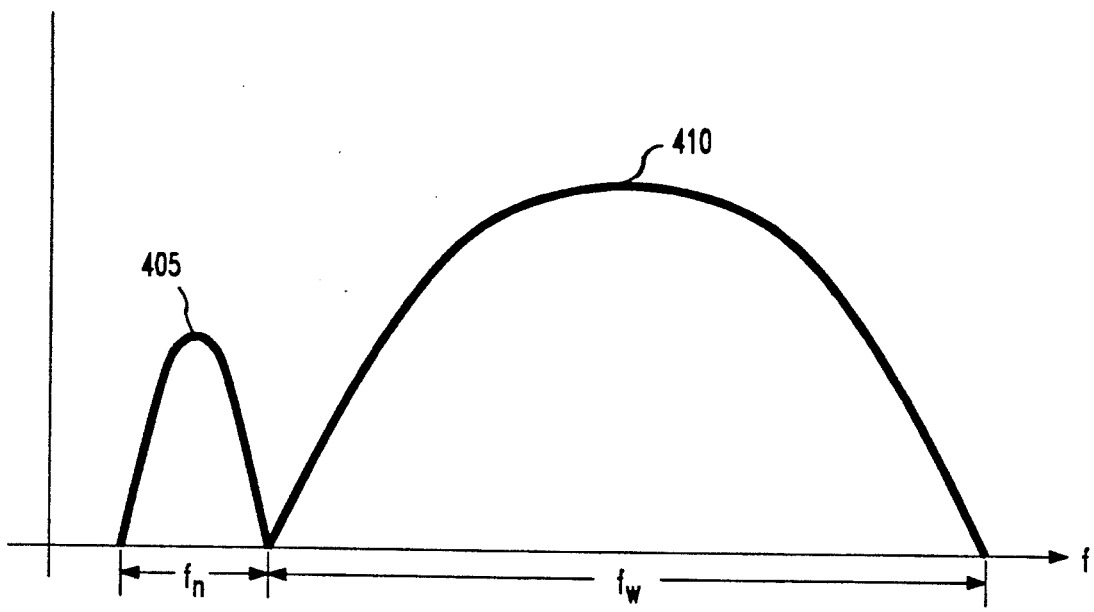
FIG. 6 is a diagram showing an out-of-band side channel for use in the modem of FIG. 2.

An example of an out-of-band side channel is one that does frequency-division-multiplexing (FDM) of the data and the re-authentication information. This form of out-of-band channel is also known as a "secondary channel," which is typically a narrow part of the frequency spectrum that is dedicated to a low bit rate channel. An illustrative frequency spectrum is shown in FIG. 6, where it is assumed that the data connection comprises primary channel 410, with bandwidth $f_w$, which transmits the data information, and ancillary, or narrow-band, channel 405, with bandwidth $f_n$, which transmits the re-authentication information.

Figure 7:
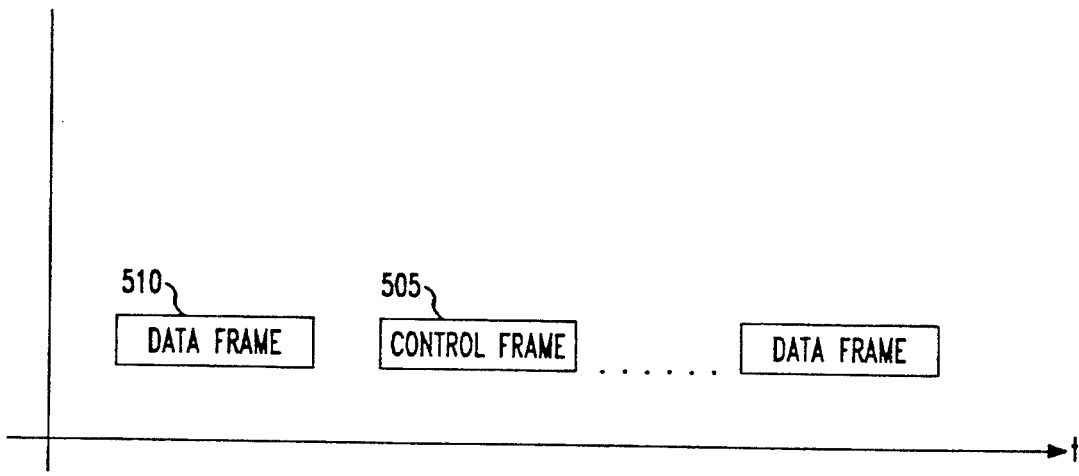
FIG. 7 is a diagram showing an in-band side channel for use in the modem of FIG. 2.

An example of an in-band side channel is one that performs time-division-multiplexing of the data and the re-authentication information. This is shown in FIG. 7, where it is assumed that the actual structure for transmitting data between modem 200 and modem 120 utilizes an underlying modem protocol, like a modified version of CCITT V.42. The latter is an HDLC-like protocol that comprises "data frames" for the transmission of data and "control frames" for the transmission of control, or ancillary, information. As shown in FIG. 7, data frames, like data frame 510, are time-division-multiplexed with control frames, like control frame 505. The re-authentication information is simply transmitted between modems 200 and 120 using known techniques within control frame 505.

As described above, both the originating modem and the answering modem share the same data encryption key during the re-authentication process. This is known as "symmetric" data encryption. Consequently, both modems must store the same data encryption key information. In addition, at least the originating modem must store its modem ID. Finally, one, or both, of these modems maintains the above-described key list, which associates a list of possible originating modem IDs with respective data encryption keys that are identical to the data encryption key stored in the identified modem. All of this information is initialized a priori using well-known techniques for administration of modem parameters. For example, this information can be entered via a terminal connected to the modem, or can be remotely initialized by the use of "downloading" techniques.

Although the above-described repetitive re-authentication protocol illustrates a challenge/response protocol, other re-authentication protocols are possible. For example, although less secure than the above-described approach, modems 120 and 200 can use a simple password technique in which each modem comprises an identical list of passwords, where each password is associated with a number. In this context, the challenge sent by modem 200 is simply one of the numbers that is associated with a password. The response by modem 120 is simply the password assigned to that number (challenge). Modem 200 then compares the received password (response) with the correct password as indicated on its list of passwords in order to determine the authentication of modem 120.

Another example, which is as secure as the above-described symmetric data encryption challenge/response protocol, is the use of a "public key" technique, which is an "asymmetric" form of data encryption like the currently proposed "Digital Signature Standard" developed by the U.S. National Institute of Standards and Technology (NIST). The public key technique is asymmetric because different keys are used for encryption and decryption. Furthermore, one key is kept secret; the other key can be made public knowledge. In particular, modem 200 sends a challenge, as described above, to modem 120. However, modem 120 returns the challenge with a "digital signature" and a "certificate" attached. The digital signature is a digital bit pattern that is a function of the challenge and modem 120's secret data encryption key, which is not known to modem 200. The certificate, as is known in the art, includes identification information from modem 120 and the public key. In this approach, modem 200 does not have to keep a list of modem identifiers and associated data encryption keys since the "requestor" will always supply the public key.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the continuous re-authentication process described above was illustrated in the context of a modem-to-modem data connection, other forms of data communications equipment, like terminal adaptors, can perform this continuous re-authentication.

In addition, although the re-authentication is continuous, the time delay, T, between re-authentication attempts does not have to be periodic, but can be "aperiodic," i.e., variable, throughout the duration of the data connection. Further, other forms of side channels are possible, like modulation of the primary signal point constellation. Also, although, as described above, the originating modem's ID was received after the handshaking process, the receipt of modem identification information can occur during the handshaking process.

Also, although the above example illustrated a one-way challenge/response authentication using encryption, any type of authentication protocol, like a two-way, node-to-node, re-authentication protocol, can be used to authenticate the identify of the communicating entity. For example, to provide a two-way re-authentication protocol, the originating modem performs similar steps to the answering modem as described above and shown in FIG. 3. Specifically, the originating modem also requests the answering modem to identify itself, upon which the originating modem issues a challenge that must be correctly encrypted by the answering modem. If the decrypted response of the answering modem does not match the originating modem's challenge, the originating modem interrupts the data connection.

We claim:

1. Apparatus for re-authenticating a user of a data connection, the data connection comprising a primary channel and a side channel, the apparatus comprising:
   means for sending and receiving to a) send a request for identification to the user and receive an identifier from the user and b) send a plurality of challenges to and receive a plurality of responses from the user on the side channel, where each one of the plurality of responses corresponds to a respective one of the plurality of challenges; and
   means for verifying each one of the plurality of responses as a function of each one of the respective plurality of challenges to provide an output representative of the verification of each one of the plurality of responses;
wherein the means for verifying encrypts each one of the plurality of challenges, where the encryption is a function of a data encryption key that is selected as a function of the identifier of the user and wherein the means for verifying compares each one of the plurality of responses with each respective one of the plurality of encrypted challenges to provide the output representative of verification, whereby if there is a mismatch between a respective one of the plurality of encrypted challenges and the one of the plurality of responses the data connection is interrupted.

2. The apparatus of claim 1 wherein the means for verifying is a function of a symmetric data encryption algorithm.

3. The apparatus of claim 1 wherein the means for verifying is a function of an asymmetric data encryption algorithm.

4. The apparatus of claim 1 wherein each one of the respective challenges is a random number and the means for verifying and the means for sending are included within a data communications equipment apparatus.

5. The apparatus of claim 1 wherein the side channel is an in-band channel.

6. The apparatus of claim 5 wherein the in-band channel is time division multiplexed with the primary channel.

7. The apparatus of claim 1 wherein the side channel is an out-of-band channel.

8. The apparatus of claim 7 wherein the out-of-band channel is frequency division multiplexed with the primary channel.

9. Data communications equipment apparatus for re-authenticating a user of a data connection, the data communications equipment apparatus comprising:
   means for sending and receiving to a) send a request for identification to a second data communications equipment apparatus and receive an identifier from the second data communications equipment apparatus and b) send a plurality of challenges to and receive a plurality of responses from the second data communication equipment apparatus of the user, where each one of the plurality of responses corresponds to a respective one of the plurality of challenges; and
   means for verifying each one of the plurality of responses as a function of each one of the respective plurality of challenges to provide an output representative of the verification of each one of the plurality of responses;
wherein the means for verifying encrypts each one of the plurality of challenges, where the encryption is a function of a data encryption key that is selected as a function of the identifier of the second communications equipment apparatus and wherein the means for verifying compares each one of the plurality of responses with each respective one of the plurality of encrypted challenges to provide the output representative of verification, whereby if there is a mismatch between a respective one of the plurality of encrypted challenges and the one of the plurality of responses the data connection is interrupted.

10. The apparatus of claim 9 wherein the means for verifying is a function of a symmetric data encryption algorithm.

11. The apparatus of claim 9 wherein the means for verifying is a function of an asymmetric data encryption algorithm.

12. The apparatus of claim 9 wherein each one of the respective challenges is a random number and the data communications equipment apparatus is a modem.

13. A method for re-authenticating a user of a data connection, the data connection comprising a primary channel and a side channel, the method comprising the steps of:
 sending a request for identification to the user and receiving an identifier from the user in response thereto;
 sending a plurality of challenges to and receiving a plurality of responses from the user on the side channel, where each one of the plurality of responses corresponds to a respective one of the plurality of challenges; and
 verifying each one of the plurality of responses as a function of each one of the respective plurality of challenges to provide an output representative of the verification of each one of the plurality of responses;
wherein the step of verifying encrypts each one of the plurality of challenges, where the encryption is a function of a data encryption key that is selected as a function of the identifier of the user and wherein the step of verifying compares each one of the plurality of responses with each respective one of the plurality of encrypted challenges to provide the output representative of verification, whereby if there is a mismatch between a respective one of the plurality of encrypted challenges and the one of the plurality of responses the data connection is interrupted.

14. The method of claim 13 wherein the step of verifying is a function of a symmetric data encryption algorithm.

15. The method of claim 13 wherein the step of verifying is a function of an asymmetric data encryption algorithm.

16. The method of claim 13 wherein each one of the respective challenges is a random number.

17. The method of claim 13 wherein the side channel is an in-band channel.

18. The method of claim 17 wherein the in-band channel is time division multiplexed with the primary channel.

19. The method of claim 13 wherein the side channel is an out-of-band channel.

20. The method of claim 19 wherein the out-of-band channel is frequency division multiplexed with the primary channel.

21. A method for re-authenticating a user of a data connection for use in a first data communications equipment apparatus, the data connection comprising the first data communications equipment apparatus and a second data communication equipment apparatus of the user, the method comprising the steps of:
 a) sending a request for identification to the second data communications equipment apparatus and receiving an identifier from the second data communications equipment apparatus;
 b) sending a plurality of challenges to and receiving a plurality of responses from the second data communication equipment apparatus, where each one of the plurality of responses corresponds to a respective one of the plurality of challenges; and
 c) verifying each one of the plurality of responses as a function of each one of the respective plurality of challenges to provide an output representative of the verification of each one of the plurality of responses wherein the verifying step includes:
 encrypting each one of the plurality of challenges, where the encryption is a function of a data encryption key that is selected as a function of the identifier of the second communications equipment apparatus; and
 comparing each one of the plurality of responses with each respective one of the plurality of encrypted challenges to provide the output representative of verification, whereby if there is a mismatch between a respective one of the plurality of encrypted challenges and the one of the plurality of responses the data connection is interrupted.

22. The method of claim 21 wherein the verifying step b) is a function of a symmetric data encryption algorithm.

23. The method of claim 21 wherein the verifying step b) is a function of an asymmetric data encryption algorithm.

24. The method of claim 21 wherein each one of the respective challenges is a random number and the data communications equipment apparatus is a modem.

25. A method for re-authenticating a user of a data connection, the data connection comprising a first data communications equipment apparatus and a second data communications equipment apparatus, the method comprising the steps of:
 a) storing in the first data communications equipment apparatus a key list comprising a plurality of identification numbers, each identification number associated with a data encryption key;
 b) receiving in the first data communications equipment apparatus an identification number from the second data communications equipment apparatus;
 c) retrieving from the key list the data encryption key associated with the identification number received from the second data communications equipment apparatus;
 d) sending a challenge from the first data communications equipment apparatus to the second data communications equipment apparatus, the challenge comprising a number;
 e) receiving in the first data communications equipment apparatus a response from the second data communications equipment apparatus, the response comprising a number; and
 f) processing the response from the second data communications equipment apparatus by encrypting the challenge as a function of the retrieved data encryption key to provide an encrypted challenge; and
 g) comparing the response with the encrypted challenge and repeating steps d) through g) if the response is equal to the encrypted challenge and interrupting the data connection if the response is not equal to the encrypted challenge.

26. The method of claim 25 wherein the first data communications equipment apparatus is the originator of the data connection.

27. The method of claim 25 wherein the second data communications equipment apparatus is the originator of the data connection.

28. The method of claim 25 wherein the challenge of step d) and the response of step e) are carried by a side channel over the data connection.

29. The method of claim 25 wherein the side channel is an in-band channel.

30. The method claim 25 wherein the side channel is an out-of-band channel.

* * * * *